(12) United States Patent
Maruko (10) Patent No.: US 7,690,703 B2
(45) Date of Patent: Apr. 6, 2010

(54) FRONT BUMPER

(75) Inventor: Tadashi Maruko, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 279 days.

(21) Appl. No.: 11/863,863

(22) Filed: Sep. 28, 2007

(65) Prior Publication Data
US 2008/0079271 A1   Apr. 3, 2008

(30) Foreign Application Priority Data
Oct. 2, 2006   (JP)   .......................... P2006-270343

(51) Int. Cl.
*B62D 25/08* (2006.01)
(52) U.S. Cl. .................. 293/102; 293/115; 296/187.09
(58) Field of Classification Search ............ 296/203.02, 296/193.1, 187.09, 187.1, 193.09; 180/68.6; 362/505
See application file for complete search history.

(56) References Cited

U.S. PATENT DOCUMENTS

| 4,466,646 | A | * | 8/1984 | Delmastro et al. ........... 293/117 |
| 5,123,695 | A | * | 6/1992 | Kanemitsu et al. ...... 296/193.09 |
| 6,357,821 | B1 | * | 3/2002 | Maj et al. ............... 296/193.09 |
| 6,520,553 | B2 | | 2/2003 | Muramatsu |
| 6,923,495 | B2 | * | 8/2005 | Kishikawa et al. ...... 296/193.09 |
| 7,014,257 | B2 | * | 3/2006 | Lazzeroni et al. ....... 296/203.02 |
| 7,097,239 | B2 | * | 8/2006 | Lazzeroni ............... 296/203.01 |
| 7,246,832 | B2 | * | 7/2007 | Cobble et al. ................ 293/115 |
| 7,306,271 | B2 | * | 12/2007 | Kang et al. .................. 293/115 |
| 2002/0117875 | A1 | * | 8/2002 | Hoffner et al. .............. 296/194 |

FOREIGN PATENT DOCUMENTS

| JP | 3-54042 | 3/1991 |
| JP | 10-53080 | 2/1998 |
| JP | 2001-213252 | 8/2001 |
| JP | 2002-154394 | 5/2002 |
| JP | 2002-326585 | 11/2002 |
| JP | 2005-306125 | 11/2005 |

OTHER PUBLICATIONS

English language Abstract of JP 2002-326585, Nov. 12, 2002.
English language Abstract of JP 2001-213252, Aug. 7, 2001.
English language Abstract of JP 3-54042, Mar. 8, 1991.
English language Abstract of JP 10-53080, Feb. 24, 1998.
Chinese Office Action issued in Application No. 200710163120.3 on Jun. 5, 2009.
English language Abstract of JP 2002-154394.

* cited by examiner

*Primary Examiner*—Joseph D Pape
(74) *Attorney, Agent, or Firm*—Stein McEwen, LLP (57) ABSTRACT

A bumper body extends in a vehicle-width direction and is formed with an air intake opening. A garnish extends in a vehicle-width direction, is attached to the air intake opening and has a first engaging portion. A bezel is adapted to cover a light of the vehicle, is attached to the bumper body and has a first engaged portion. The garnish and the bezel are arranged in the vehicle-width direction. The first engaged portion is engaged with the first engaging portion.

4 Claims, 6 Drawing Sheets

FRONT BUMPER

The disclosure of Japanese Patent Application No. 2006-270343 filed on Oct. 2, 2006 including specification, drawings and claims is incorporated herein by reference in its entirety.

BACKGROUND

The present invention relates to a front bumper of a vehicle, having a garnish which extends in a vehicle-width direction and is attached to an air intake opening of a bumper body and a bezel which covers the periphery of a light attached to the bumper body.

A radiator for cooling an engine is provided in a vehicle. A grille and an air intake opening are provided respectively at the upper part and the lower part of the bumper body of the front bumper for the intake of cooling air into the radiator or an engine room. A decorative garnish extending in a vehicle-width direction is attached to the air intake opening from a rear side of the bumper body (refer to Patent Document 1). In addition to the garnish, a bezel covering and decorating the periphery of lamps lights) such as a fog lamp attached to the bumper body (border of a lamp opening) may be attached to the bumper body from a front side thereof.

In a related-art front bumper, the garnish extending in the vehicle-width direction and the bezel are arranged apart from each other in the vehicle-width direction, and the surface of the bumper body is visible between the garnish and the bezel from the front side of the vehicle.

Patent Document 1:
Japanese Patent Publication No. 2002-154394A

In recent years, an opening area of the air intake opening has been enlarged due to demand to improve a cooling performance, and a garnish and a bezel have been arranged in close proximity. Further, there is a tendency that the garnish and the bezel are utilized to partially change the color of the bumper in relation to the design of the vehicle. However, in the above-described related-art front bumper where the garnish and the bezel are arranged apart from each other and the surface of the bumper body is visible between the garnish and the bezel from the front side of the vehicle, the design is not well organized and there remains room for improvement. There is an idea to arrange the bezel and the garnish in an integrated manner. However, the bezel is attached from the front side of the vehicle and the garnish is attached from the rear side of the vehicle to the bumper body, the integration of which is rendered impossible.

SUMMARY

It is therefore an object of the invention to provide a front bumper in which a garnish and a bezel are arranged in a well-organized manner to improve the design thereof.

In order to achieve the above objects, according to an aspect of the invention, there is provided a front bumper for a vehicle, comprising: a bumper body extending in a vehicle-width direction and formed with an air intake opening; a garnish extending in a vehicle-width direction, attached to the air intake opening and having a first engaging portion; and a bezel adapted to cover a light of the vehicle, attached to the bumper body and having a first engaged portion, wherein: the garnish and the bezel are arranged in the vehicle-width direction; and the first engaged portion is engaged with the first engaging portion.

According to the above constitution, the garnish extending in the vehicle-width direction and the bezel are continuously arranged in the vehicle-width direction so that the surface of the bumper body is not visible between the garnish and the bezel from the front side of the vehicle. It is, therefore, possible to arrange the garnish and the bezel in a well-organized manner to improve the design thereof. Then, the first engaging portion provided on the bezel and the first engaged portion provided on the garnish are engaged. Thereby, the garnish can be positioned with respect to the bezel, and the corner of the bezel and the garnish (border portion) can be easily spaced at a constant distance. Thereby a better appearance is given to improve the merchantability.

The garnish may be attached to the bumper body from a front side of the vehicle; and the bezel may be attached to the bumper body from a rear side of the vehicle.

Only the bezel, which is relatively small in size, is attached to the bumper body from the front side of the vehicle and arranged on the surface thereof, by which the corner of the bezel and the bumper body can be built more accurately and easily spaced at a constant distance. Thereby, a better appearance is given to improve the merchantability. Since the garnish is located behind the bumper body, the border portion with the bumper body visible from the front side of the vehicle is to give an opening rim of the bumper body. It is, therefore, less likely to cause a defective appearance. Further, the bezel and the garnish are engaged with and fixed to each other while holding the bumper body therebetween, thus making it possible to fix the bezel to the garnish reliably.

The bezel may have a plurality of second engaging portions; the bumper body may have a plurality of second engaged portions; a first set of the second engaged portions may be respectively engaged with a first set of the second engaging portions such that the bezel is positioned relative to the bumper body in the vehicle-width direction; and a second set of the second engaged portions may be respectively engaged with a second set of the second engaging portions such that the second set of the second engaging portions are permitted to move in the vehicle-width direction relative to the second set of the second engaged portions.

A predetermined number of the second engaging portions (the first set of the second engaging portions) of a plurality of the above-described second engaging portions, provided on one side of the bezel on the side of a vehicle are respectively engaged with a predetermined number of the second engaged portions (the first set of the second engaged portions) provided on the bumper body. Thus, the bezel is positioned in the vehicle-width direction relative to the bumper body. Therefore, the corner of the bezel and the bumper body can be easily spaced at a constant distance on the side of the vehicle. Further, a predetermined number of the remaining second engaging portions (the second set of the second engaging portions) are engaged with a predetermined number of the remaining second engaged portions (the second set of the second engaged portions), with a degree of freedom given in a vehicle-width direction, so that they are permitted to change in position in the vehicle-width direction. Thus, if a predetermined number of the remaining second engaging portions are engaged with a predetermined number of the remaining second engaged portions, a predetermined number of the second engaging portions provided on one side of the bezel on the side of the vehicle or a predetermined number of the second engaged portions provided on the bumper body are not pushed back and forth in the vehicle-width direction. As a result, a position at which the second engaging portions provided on one side are engaged with the second engaged portions is not deviated by the influence of an engagement of the remaining second engaging portions with the remaining second engaged portions. Thereby, the bezel can be attached to the bumper body with reference to a position on the side of the vehicle, which is relatively noticeable. Further, the corner on the side of the vehicle can be spaced at a predetermined value reliably, thereby giving a better appearance to the vehicle.

A plurality of the first engaging portions may be respectively engaged with a plurality of the first engaging portions such that the garnish is positioned relative to the bezel in the vehicle-width direction; the bumper body may have a plurality of third engaging portions; the garnish may have a plurality of third engaged portions; the third engaged portions may be respectively engaged with the third engaging portions such that the third engaging portions are permitted to move in the vehicle-width direction relative to the third engaged portions; the garnish may have a fixing portion in the vicinity of one of the first engaging portions which engages with one of the first engaged portions; and the bumper body may have a fixed portion fixed to the fixing portion.

A plurality of the first engaging portions of the bezel can be individually engaged with a plurality of the first engaged portions of the garnish, by which the garnish is positioned in the vehicle-width direction with respect to the bezel. Therefore, the corner of the bezel and the garnish can be easily spaced at a constant distance in the vehicle-width direction. Further, a plurality of third engaging portions are provided on the bumper body, and a plurality of third engaged portions which are engaged with the third engaging portions are provided on the garnish. Then, the third engaging portions are engaged with the third engaged portions, with a degree of freedom given in the vehicle-width direction, so that they are permitted to change in position in a vehicle-width direction. As a result, if the third engaging portions are engaged with the third engaged portions, the first engaging portions on the bezel or the first engaged portions on the garnish are not pushed back and forth in the vehicle-width direction, and a position at which the bezel is engaged with the garnish is not deviated by the influence of the engagement of the third engaging portions with the third engaged portions. Thereby, the garnish can be attached to the bumper body by referring to the position with respect to the bezel, and the corner of the bezel and the garnish can be spaced at a predetermined value reliably to give a better appearance to the vehicle. Then, in the vicinity of any one of the first engaging portions and the first engaged portion which is engaged with the first engaging portion concerned, the fixing portion provided on the garnish is locked and fixed to the fixed portion provided on the bumper body. Therefore, the garnish can be fixed firmly to the bumper body.

The bumper body may have an attached portion so that a license-plate attached to the attached portion covers a boundary between the bumper body and one side portion of the garnish which is opposite to the other side portion of the garnish adjacent to the bezel.

The bezel is attached to the bumper body by referring to a position of the side of the vehicle. The garnish is attached to the bumper body by referring to a position of the attached bezel. Members of the front bumper are sequentially attached by referring to one side of the vehicle in the vehicle-width direction. Accordingly, a relative positional deviation is accumulated in the boundary between the bumper body and the one side portion of the garnish. According the above constitution, the boundary can be covered with the license plate. Thus, it is easy to secure a sufficient accuracy in shape of each component, resulting in an improved productivity and giving a better appearance to a vehicle.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Figure 1:
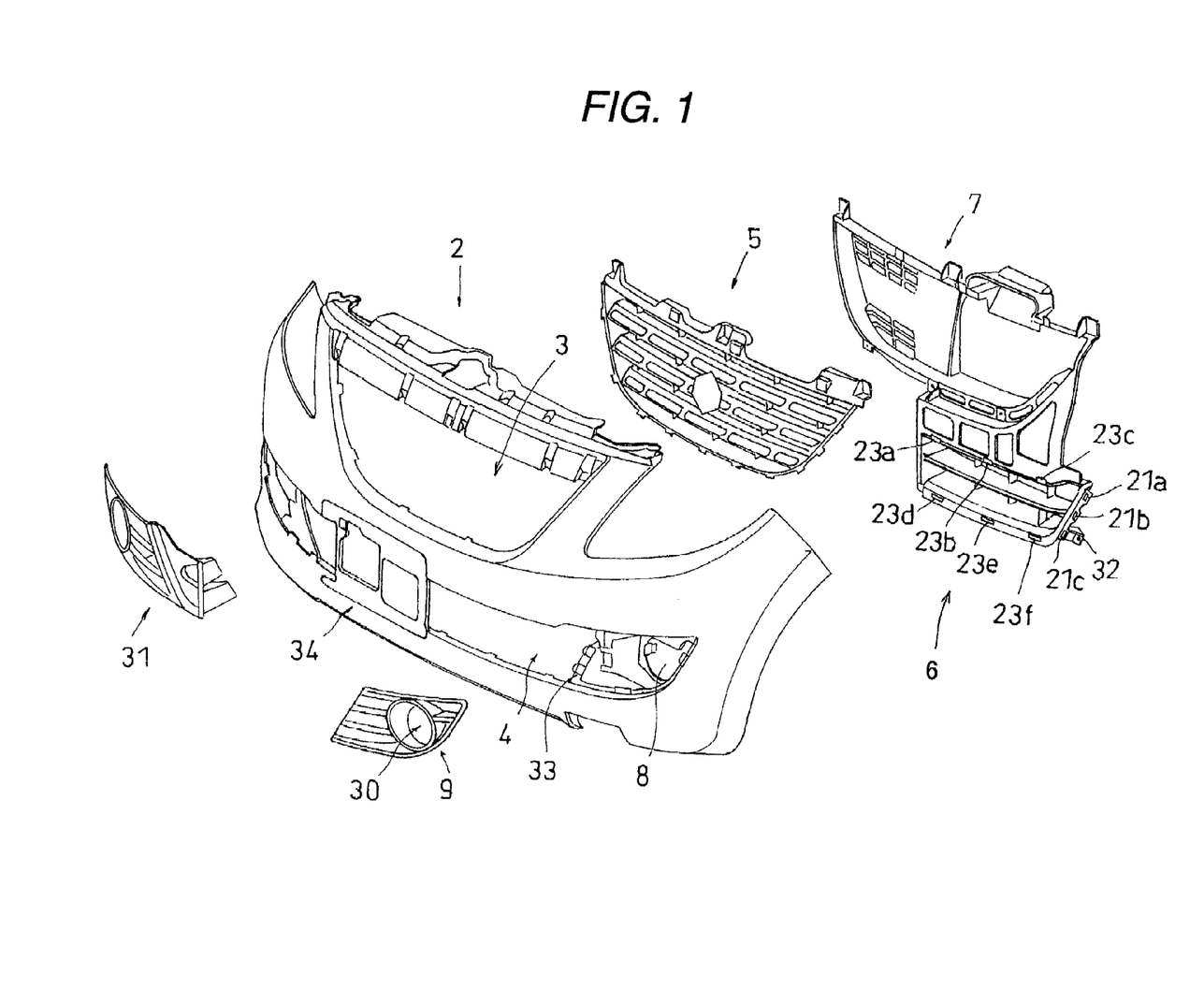
FIG. 1 is an exploded perspective view of a front bumper according to an embodiment of the present invention.
Figure 2:
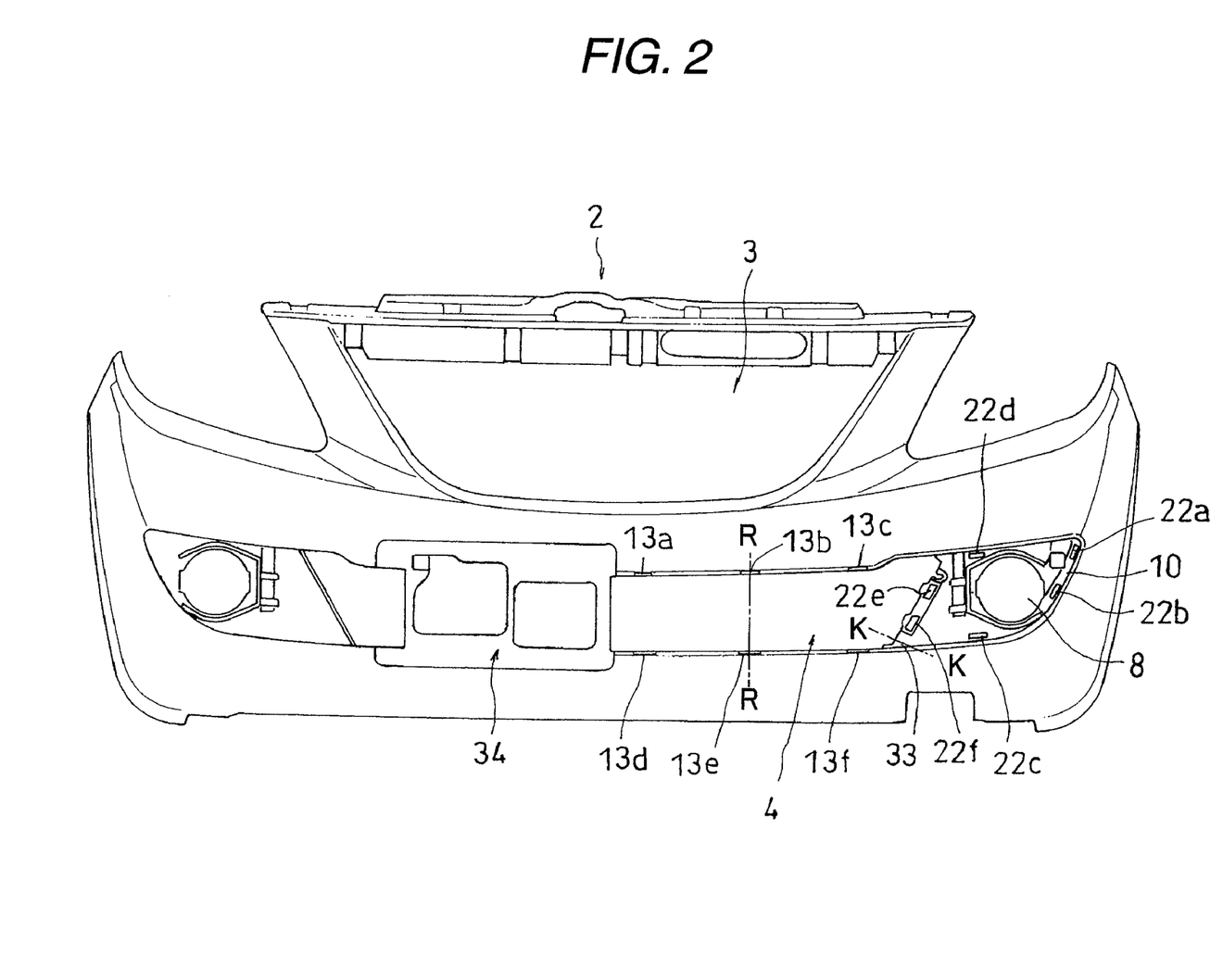
FIG. 2 is a front view of the front bumper.
Figure 3:
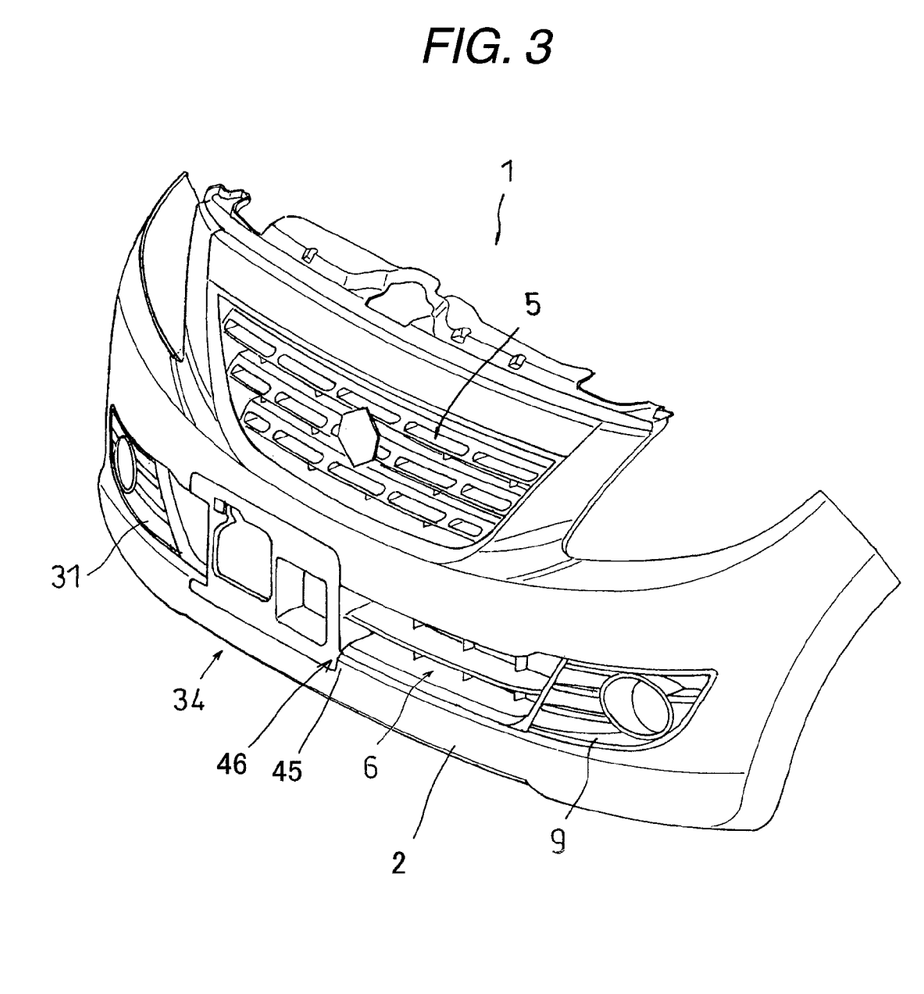
FIG. 3 is a perspective view of the front bumper.

Hereinafter, an embodiment of the invention will be described in detail with reference to the drawings. FIG. 1 is an exploded perspective view of an automotive front bumper 1 (hereinafter, referred to as "bumper 1"). FIG. 2 is a front elevation view of a front bumper body 2 (hereinafter, referred to as "bumper body 2"). FIG. 3 is a perspective view of the bumper 1. The bumper body 2 is provided with a large first air intake opening 3 at the upper center in a vehicle-width direction and a second air intake opening 4 which is long in a vehicle-width direction at the lower center thereof. A decorative grille 5 is attached to the first air intake opening 3 from the rear side of a vehicle, and a first decorative garnish 6 is attached to the second air intake opening 4 from the rear side of the vehicle. The first garnish 6 extends in a vehicle-width direction. Further, the grille 5 is covered with a second decorative garnish 7 from the rear side of the vehicle. The first garnish 6 and the second garnish 7 are formed in an integrated manner. Then, lights such as fog lamps are attached to both sides of the second air intake opening 4 in a vehicle-width direction. A left bezel 9 (hereinafter, referred to as "bezel 9") and a right bezel 31 which cover and decorate the periphery of lights attached to the bumper body 2 are attached to the bumper body 2 from the front side of the vehicle. The reference numeral 8 denotes a hole for the light.

Figure 4:
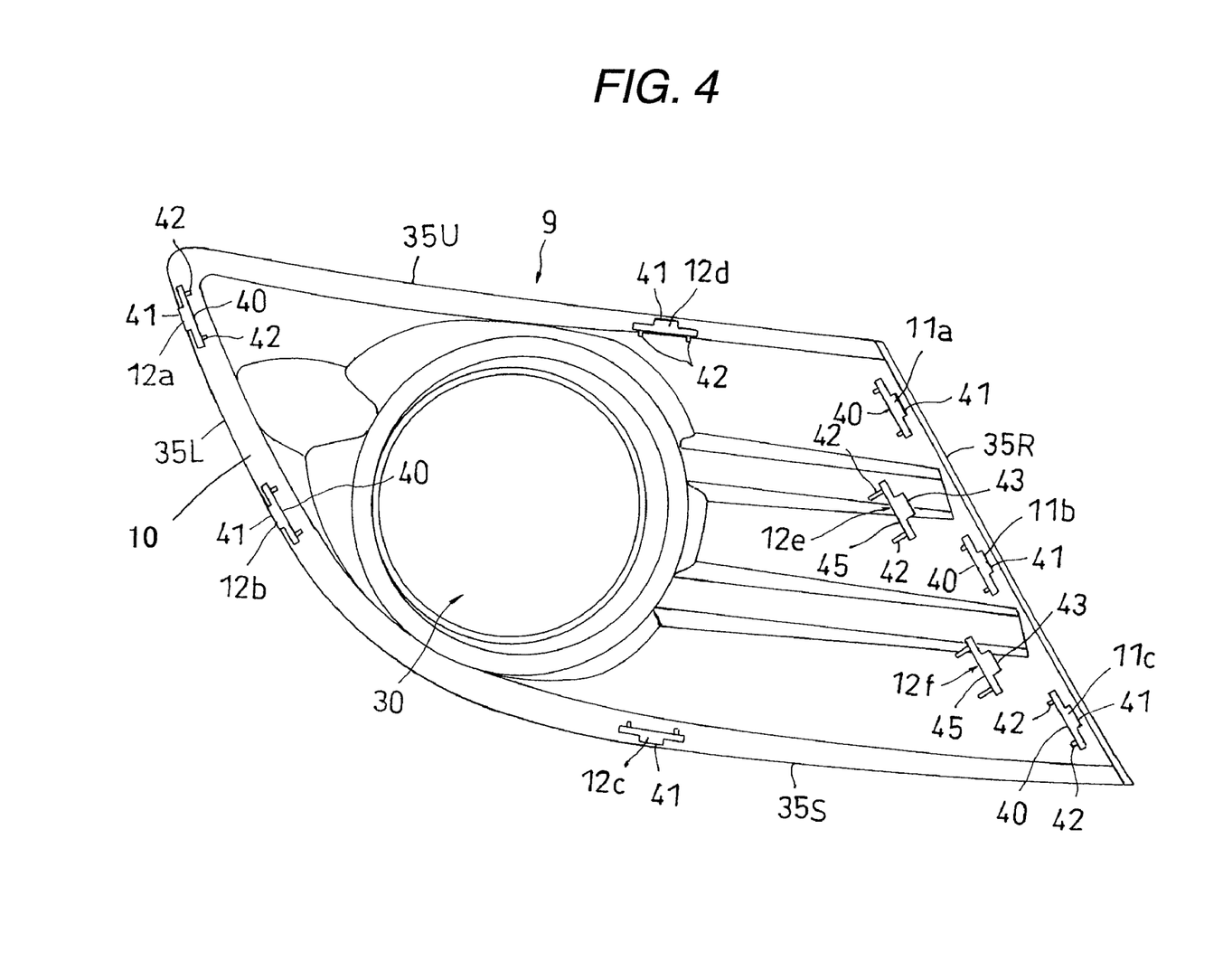
FIG. 4 is a schematic diagram of a bezel as seen from reverse side thereof according to the embodiment.
Figure 5:
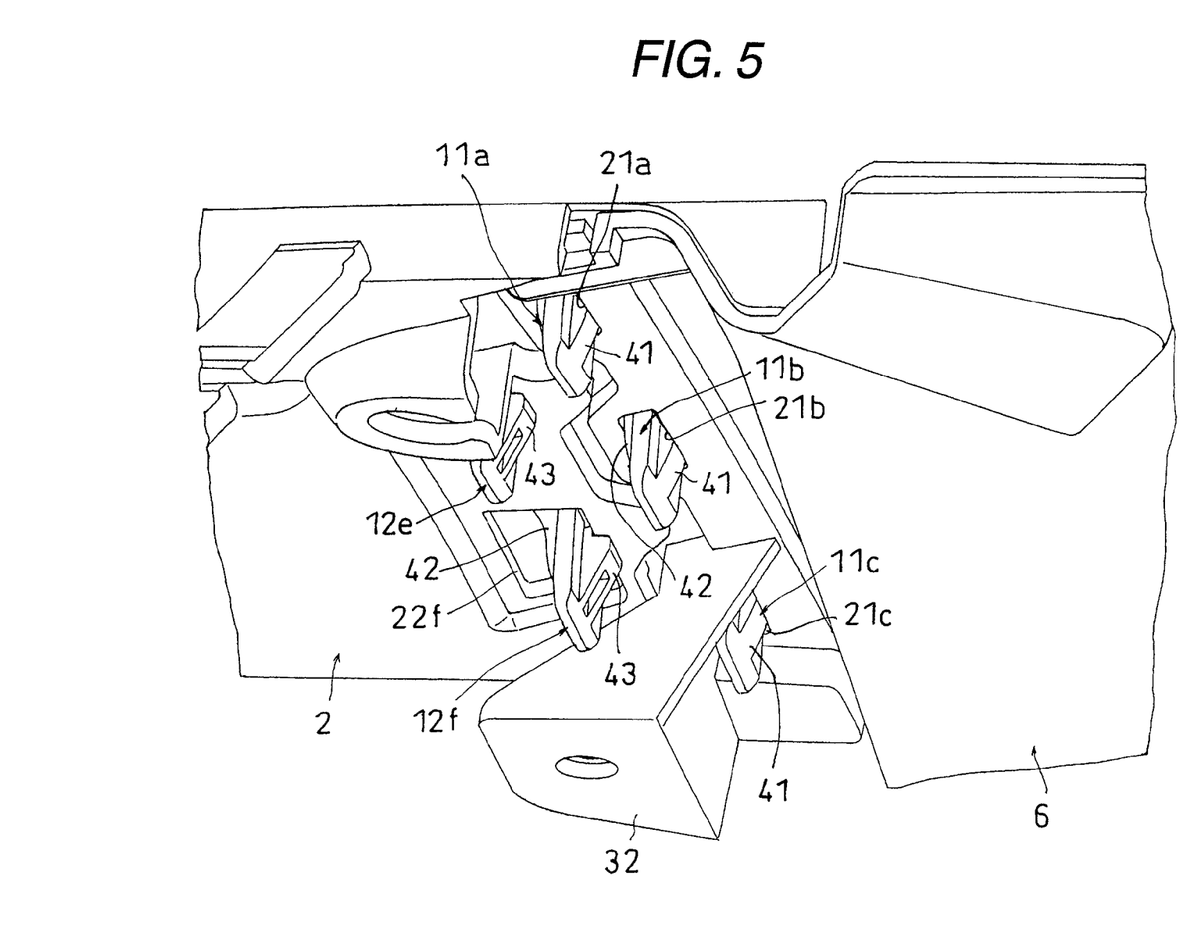
FIG. 5 is a view showing an engagement structure among a first garnish, a bumper body and the bezel as seen from reverse side thereof according to the embodiment.

As illustrated in FIG. 3, a first garnish 6 and a bezel 9 are arranged so that the first garnish 6 and the bezel 9 are continuously arrayed in a vehicle-width direction to make invisible the surface of a bumper body 2 between the first garnish 6 and the bezel 9 from the front of a vehicle, and a plurality of first plate-like engaging portions 11a to 11c (refer to FIG. 4) provided on the bezel 9 are individually engaged with a plurality of first engaged portions 21a to 21c (refer to FIG. 1) provided on the first garnish 6 (refer to FIG. 5). More specifically, a portion of the bezel 9 at which the first engaging portions 11a to 11c are formed projects to the front of a second air intake opening 4 of the bumper body 2 when viewed from the front of the vehicle and a portion of the first garnish 6 at which the first engaged portions 21a to 21c are formed is arranged in front of the second air intake opening 4 and engaged therewith, passing through the second air intake opening 4 of the bumper body 2 from the rear side of the vehicle to cover an opening rim of the second air intake opening 4 of the bumper body 2. Then, a plurality of the first engaging portions 11a to 11c on the bezel 9 are individually engaged with a plurality of the first engaged portions 21a to 21c on the first garnish 6 so that they are not allowed to change in position in a vehicle-width direction (a relative positional movement of the bezel 9 with respect to the bumper body 2 in a vehicle-width direction). Thereby, the first garnish 6 is positioned with respect to the bezel 9 in a vehicle-width direction. It is noted that the first garnish 6 and the bezel 9 are made of a resin material of the same color. The reference numeral 30 given in FIG. 4 is a hole for a light provided on the bezel 9.

Then, a plurality of second plate-like engaging portions 12a to 12f (refer to FIG. 4) are provided on the bezel 9, and a plurality of second engaged portions 22a to 22f (refer to FIG. 2) which are engaged with the second engaging portions 12a to 12f are provided on the bumper body 2. Of a plurality of the second engaging portions 12a to 12f, a predetermined number (two) of the second engaging portions 12a and 12b provided on one side 10 of the bezel on the side of a vehicle are individually engaged with a predetermined number (two) of the second engaged portions 22a and 22b provided on the bumper body 2 so that they are not allowed to change in position in a vehicle-width direction (a relative positional movement of the bezel 9 with respect to the bumper body 2 in a vehicle-width direction), thereby the bezel 9 is positioned with respect to the bumper body 2 in a vehicle-width direction. Further, a predetermined number of the remaining second engaging portions 12c to 12f are engaged with a predetermined number of the remaining second engaged portions 22c to 22f so that they are allowed to change in position in a vehicle-width direction (a relative positional movement of the bezel 9 with respect to the bumper body 2 in a vehicle-width direction). A pair of the second engaging portions 12c and 12d are engaged with a pair of the second engaged portions 22c and 22d so that they are not allowed to change in position in a vertical direction.

As described above, a plurality of the first engaging portions 11a to 11c provided on the bezel 9 are individually engaged with a plurality of the first engaged portions 21a to 21c on the first garnish 6 so that they are not allowed to change in position in a vehicle-width direction, thereby the first garnish 6 is positioned with respect to the bezel 9 in a vehicle-width direction. Then, a plurality of third plate-like engaging portions 13a to 13f (refer to FIG. 2) are provided on the bumper body 2, and a plurality of the third engaged portions 23a to 23f (refer to FIG. 1) which are engaged with the third engaging portions 13a to 13f are provided on the first garnish 6. Further, a plurality of the third engaging portions 13a to 13f are engaged with a plurality of the third engaged portions 23a to 23f so that they are allowed to change in position with respect to each other in a vehicle-width direction but not allowed to change in position in a vertical direction.

(First Engaging Portions)

FIG. 4 is a view of the bezel 9 when viewed from behind (from the rear side of a vehicle). As illustrated in FIG. 4 (hereinafter, the bezel 9 will be explained for the right and left sides by referring to the right and left sides in FIG. 4 when viewed from behind the vessel). The bezel 9 is formed so that the both of the right and left end rims 35L and 35R are slanted downward to the right side and both of the upper and lower end rims 35U and 35S are slanted slightly upward to the left side. The border between the left end rim 35L and the lower end rim 35S on the bezel 9 is formed into a large circular-arc shape. The first engaging portions 11a to 11c on the bezel 9 are arrayed in a line in a vertically slanted manner in the vicinity of the right end rim 35R so as to be along the right end rim 35R. They are arrayed in the order of 11a, 11b and 11c from above. The first engaging portions are formed into a plate shape having an elastic pawl 41 at the center by projection from behind the bezel 9, with the plate face pointing approximately in a vehicle lateral direction. These first engaging portions 11a to 11c are all identical in configuration and they are the engaging projections which project to the rear side of the vehicle. One of the plate faces opposing to the left side of the vehicle is formed into a face 40 which is orthogonal to the back face of the bezel 9, and a central portion in a width direction on the other plate face opposing to the right side of the vehicle is formed into the elastic pawl 41 having an inclined face. There is formed a slit between the plate portion on both the outer sides of the first elastic pawl 41 and the first elastic pawl 41 so as to easily secure the elasticity of the elastic pawl 41. Further, a pair of reinforcement ribs 42 are provided at predetermined intervals in a width direction at a position joining to the back face of the bezel 9 on the orthogonal face 40.

(First Engaged Portions)

As illustrated in FIG. 1, a plurality of the first engaged portions 21a to 21c on the first garnish 6 are rectangular engagement holes. As illustrated in FIG. 5, a plurality of the first engaging portions 11a to 11c are inserted and engaged with a plurality of the first engaged portions 21a to 21c on the first garnish 6, and elastic pawls 41 at the first engaging portions are caught at the back of the periphery of the first engaged portions (engagement holes), thereby preventing disengagement of the first engaging portions from the first engaged portions.

Further, the first engaged portions (engagement holes) are formed into holes, the width of which is approximately equal to the thickness of the first engaging portions in such a way as to be decreased in clearance with the first engaging portions in a direction perpendicular to the plate face of the first engaging portions which are formed into a flat plate shape. They are also formed into holes, the length of which is longer than the width of the first engaging portions in such a way as to be increased in clearance with the first engaging portions in a direction parallel to the plate face of the first engaging portions. Thereby, as described above, the first garnish 6 is positioned with respect to the bezel 9 in a vehicle-width direction.

(Second Engaging Portions)

As with the previously described first engaging portions, a plurality of the second engaging portions 12a to 12f on the bezel 9 are formed into a plate shape having an elastic pawl at the center by projection behind the bezel 9. Of a plurality of the second engaging portions 12a to 12f on the bezel 9, a pair of the second engaging portions 12a and 12b are arrayed in a line in a vertically slanted manner in the vicinity of the left end rim 35L so as to be along the left end rim 35L. They are arrayed in the order of 12a and 12b from above, with the plate face being pointed approximately in a vehicle lateral direction. More specifically, the plate face is pointed downward to the left side and upward to the right side relative to a vehicle and also in parallel with the left end rim 35L.

The second engaging portion 12c is located in the vicinity of the lower end rim 35S so as to be along the lower end rim 35S in its longitudinal direction. The second engaging portion 12d is located in the vicinity of the upper end rim 35U so as to be along the upper end rim 35U in its longitudinal direction. They are located, with both of the plate faces being pointed approximately in a vehicle vertical direction (strictly speaking, downward to the left side relative to the vehicle and upward to the right side relative to the vehicle). A pair of the above-described second engaging portions 12a and 12b and another pair of the second engaging portions 12c and 12d are identical in configuration with the first engaging portions 11a to 11c.

Then, another pair of the second engaging portions 12e and 12f are located at a site apart from the right end rim 35R further than the first engaging portions 11a to 11c and between those adjacent to each other of the first engaging portions 11a to 11c. In other words, the second engaging portions 12e and 12f are arranged on the side of the vehicle with respect to the first engaging portions 11a to 11c, whereas the second engaging portions 12e and 12f and the first engaging portions 11a to 11c are formed alternately along the right end rim 35R behind the bezel 9. Thereby, components at the engaging portion concerned can be arranged in close proximity to each other in which three components are in a mutually adjacent state. Postures of these second engaging portions 12e,12f are the same as those of the first engaging portions 11a to 11c. These second engaging portions are arrayed in a line in a vertically slanted manner so as to be along the right end rim 35R in its longitudinal direction. They are arrayed in the order of 12e and 12f from above, with both of the plate faces being pointed downward to the left side relative to the vehicle and upward to the right side relative to the vehicle.

A pair of the above-described second engaging portions 12e and 12f located between those adjacent to each other of the first engaging portions 11a to 11c are similar in structure to the first engaging portions 11a to 11c and larger in dimension than the first engaging portions. In other words, one plate face pointing downward to the left side relative to a vehicle is formed into a face 45 orthogonal to the back face of the bezel 9, and a central portion in a width direction on the other plate face pointing upward to the right side relative to the vehicle is formed into an elastic pawl 43 having an inclined face. There is formed a slit between the plate face portion on both the outer sides of the second elastic pawl 43 and the second elastic pawl 43 so as to easily secure the elasticity of the second elastic pawl 43. Further, the orthogonal face 45 is provided with a pair of reinforcement ribs 42 in its width direction. Then, the second elastic pawl 43 is projected on the base end to a greater extent than the first elastic pawl 41 on the base end. In other words, the engagement width of the second elastic pawl 43 is greater than that of the first elastic pawl 41.

(Second Engaged Portion)

As illustrated in FIG. 2, a plurality of the second engaged portions 22a to 22d on the bumper body 2 are rectangular engagement holes. A plurality of the above-described second engaging portions 12a to 12d are inserted and engaged with a plurality of the second engaged portions 22a to 22d on the bumper body 2, and elastic pawls 41 at the second engaging portions 12a to 12d are caught at the back of the periphery of the second engaged portions (engagement holes) 22a to 22d, thereby preventing disengagement of the second engaging portions from the second engaged portions. The second engaged portions (engagement holes) 22a to 22d are formed into holes, the width of which is approximately equal to the thickness of the second engaging portions 12a to 12d in such a way as to be decreased in clearance with the second engaging portions 12a to 12d in a direction perpendicular to the plate face of the second engaging portions 12a to 12d which are formed into a flat plate shape. They are also formed into holes, the length of which is longer than the width of the second engaging portions 12a to 12d in such a way as to be increased in clearance with the second engaging portions 12a to 12d in a direction parallel to the plate face of the second engaging portions 12a to 12d. Thereby, the bezel 9 is positioned with respect to the bumper body 2 in a vehicle-width direction and in a vehicle vertical direction.

Further, as illustrated in FIG. 2, a plurality of the second engaged portions 22e to 22f on the bumper body 2 are rectangular engagement holes and formed to be greater in width than other second engaged portions 22a to 22d. In other words, the other second engaged portions 22a to 22d are formed into holes, the width of which is approximately equal to the thickness of the second engaging portions in such a way as to be decreased in clearance in a direction perpendicular to the plate face of the second engaging portions. However, as illustrated in FIG. 5, the second engaged portions 22e to 22f are formed into holes, the width of which is sufficiently greater than the thickness in a direction perpendicular to the plate face of the second engaging portions 12e and 12f. Thereby, a plurality of the second engaging portions 12e to 12f are loosely engaged with a plurality of the second engaged portions 22e to 22f on the bumper body 2 so that they are allowed to change in position in a vehicle-width direction. It is noted that, as described above, they are engaged in such a way that the second elastic pawl 43 is formed to be greater in engagement width than the first elastic pawl 41, with care taken not to cause the disengagement.

Figure 7:
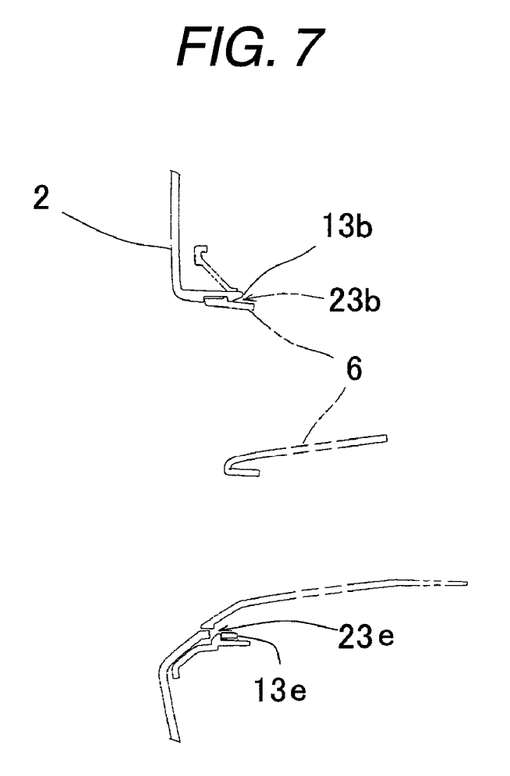
FIG. 7 is a section view taken along R-R line in FIG. 2.

As illustrated in FIG. 2, the third engaging portions 13a to 13f are transversely long engaging portions in which a plate face formed in a projected manner on the rear side of a vehicle from the upper rim and the lower rim along the lateral direction of the vehicle at the periphery of the second air intake opening 4 on the bumper body 2 is pointed in a vertical direction. The third engaged portions 23a to 23f formed on the first garnish 6 are transversely long rectangular engagement holes. As illustrated in FIG. 7, a plurality of the third engaging portions 13a to 13f are inserted and engaged with a plurality of the third engaged portions 23a to 23f on the first garnish 6 and engagement pawls provided on either the third engaging portions or the third engaged portions are engaged with other counterparts, thereby preventing the disengagement.

Further, the third engaged portions (engagement holes) are formed into holes, the width of which is approximately equal to the thickness of the third engaging portions in such a way as to be decreased in clearance with the third engaging portions in a direction perpendicular to the plate face of the third engaging portions formed into a flat plate shape. They are also formed into holes, the length of which is longer than the width of the third engaging portions in such a way as to be increased in clearance with the third engaging portions in a direction parallel to the plate face of the third engaging portions. Thereby, the third engaging portions 13a to 13f are engaged with the third engaged portions 23a to 23f so that they are allowed to change in position in a vehicle-width direction but not allowed to change in position in a vertical direction. Then, the first garnish 6 is positioned with respect to the bumper body 2 in a vertical direction.

A license-plate attaching portion 34 is disposed at the bumper body 2 so that a border portion 46 between the bumper body 2 and the side 45 opposite to the side of the bezel 9 on either side of the first garnish 6 in a vehicle-width direction is covered with a license plate. In other words, the license-plate attaching portion 34 is formed on the side of the second air intake opening 4 on the bumper body 2 and arranged so that the license plate can be projected in front of the second air intake opening 4.

Figure 6:
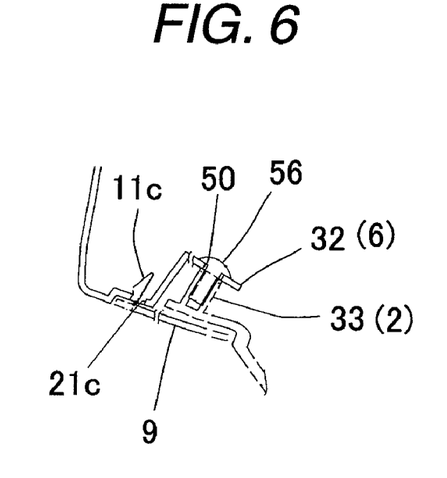
FIG. 6 is a section view taken along K-K line in FIG. 2.

As illustrated in FIG. 6, a fixing portion 32 provided on the first garnish 6 is locked and fixed with a screw 56 to a fixed portion 33 provided on the bumper body 2 in the vicinity of a first engaging portion 11c and also in the vicinity of a first engaged portion 21c engaged with the engaging portion 11c.

Thereby, the first garnish 6, which is positioned by the bezel 9 in a lateral direction relative to a vehicle, can be fixed to the bumper body 2. Therefore, it can be positioned for a longer time and more reliably. It is noted that a hole for the screw 56 formed on the fixing portion 32 is made relatively large with respect to the screw 56 so that the first garnish 6, which is positioned by the bezel 9 in a lateral direction relative to the vehicle, can be fixed to the bumper body 2. The fixed portion 33 is projected from the back face of the bumper body 2 and formed into a hollow shaft. The screw 56 is inserted into a screw insertion hole 50 at the fixing portion 32, entering into the hollow shaft at the fixed portion 33. The first garnish 6 and the bumper body 2 are locked and fixed to each other even in the vicinity of the license-plate attaching portion 34.

What is claimed is:

1. A front bumper for a vehicle, comprising:
   a bumper body extending in a vehicle-width direction and formed with an air intake opening;
   a garnish extending in a vehicle-width direction, attached to the air intake opening and having a first engaged portion; and
   a bezel adapted to cover a light of the vehicle, attached to the bumper body and having a first engaging portion, wherein:
   the garnish and the bezel are arranged in the vehicle-width direction; and
   the first engaged portion is engaged with the first engaging portion, wherein:
   a plurality of the first engaging portions are respectively engaged with a plurality of the first engaging portions such that the garnish is positioned relative to the bezel in the vehicle-width direction;
   the bumper body has a plurality of third engaging portions;
   the garnish has a plurality of third engaged portions;
   the third engaged portions are respectively engaged with the third engaging portions such that the third engaging portions are permitted to move in the vehicle-width direction relative to the third engaged portions;
   the garnish has a fixing portion in the vicinity of one of the first engaging portions which engages with one of the first engaged portions; and
   the bumper body has a fixed portion fixed to the fixing portion.

2. The front bumper as set forth in claim 1, wherein:
   the garnish is attached to the bumper body from a front side of the bumper body; and
   the bezel is attached to the bumper body from a rear side of the bumper body.

3. The front bumper as set forth in claim 1, wherein:
   the bezel has a plurality of second engaging portions;
   the bumper body has a plurality of second engaged portions;
   a first set of the second engaged portions are respectively engaged with a first set of the second engaging portions such that the bezel is positioned relative to the bumper body in the vehicle-width direction; and
   a second set of the second engaged portions are respectively engaged with a second set of the second engaging portions such that the second set of the second engaging portions are permitted to move in the vehicle-width direction relative to the second set of the second engaged portions.

4. A front bumper for a vehicle, comprising:
   a bumper body extending in a vehicle-width direction and formed with an air intake opening;
   a garnish extending in a vehicle-width direction, attached to the air intake opening and having a first engaged portion; and
   a bezel adapted to cover a light of the vehicle, attached to the bumper body and having a first engaging portion, wherein:
   the garnish and the bezel are arranged in the vehicle-width direction;
   the first engaged portion is engaged with the first engaging portion; and
   the bumper body has an attached portion so that a number plate attached to the attached portion covers a boundary between the bumper body and one side portion of the garnish which is opposite to the other side portion of the garnish adjacent to the bezel.

* * * * *